G. MACLOSKIE.
AIR BRAKE SYSTEM.
APPLICATION FILED APR. 30, 1904.
910,402.
Patented Jan. 19, 1909.
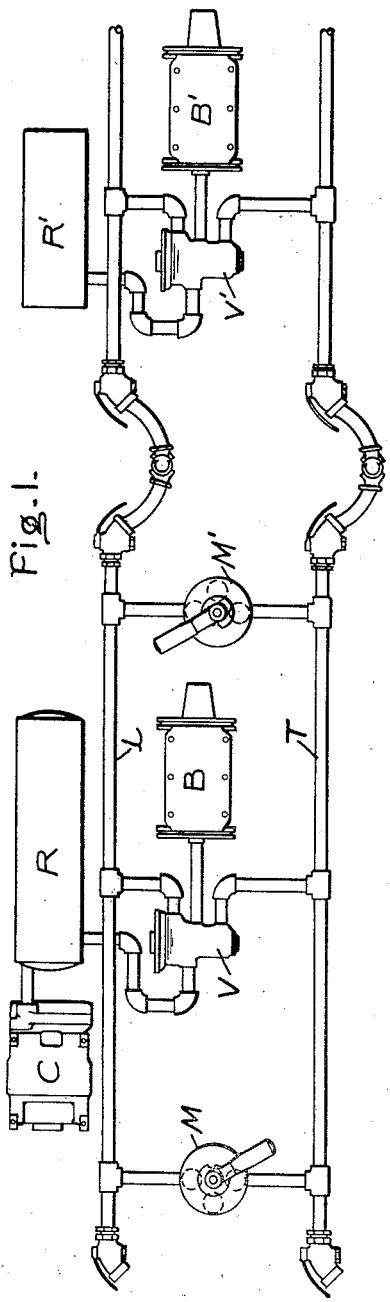
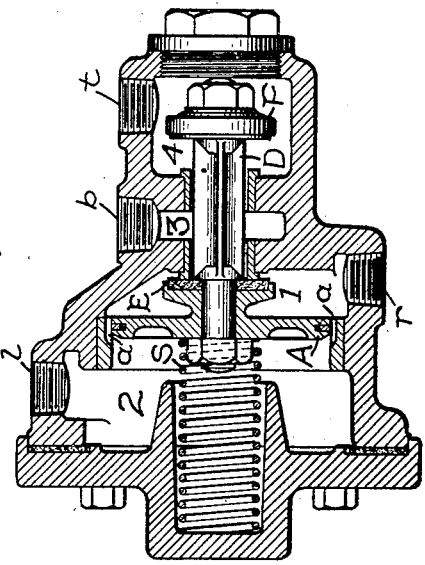
Witnesses.
Inventor:
George Macloskie

UNITED STATES PATENT OFFICE.

GEORGE MACLOSKIE, OF SCHENECTADY, NEW YORK, ASSIGNOR TO GENERAL ELECTRIC COMPANY, A CORPORATION OF NEW YORK.

AIR-BRAKE SYSTEM.

No. 910,402.  Specification of Letters Patent.  Patented Jan. 19, 1909.

Application filed April 30, 1904. Serial No. 205,654.

*To all whom it may concern:*

Be it known that I, GEORGE MACLOSKIE, a citizen of the United States, residing at Schenectady, in the county of Schenectady and State of New York, have invented certain new and useful Improvements in Air-Brake Systems, of which the following is a specification.

My invention relates to what is known as "straight" air-brake systems. In these systems the brake cylinders are connected through a motorman's valve directly to a source of compressed air, or to the atmosphere, to apply or to release the brakes. This system possesses marked advantages over what is known as the automatic system, not only in the simplicity of the apparatus, but in the ease with which both the application and release of the brakes may be graduated by the motorman. When applied to trains, however, the "straight" air-brake system has certain disadvantages as compared with the automatic system. In the first place, since the air must travel the entire length of the train to and from the brake cylinders, when the brakes are applied and released, it is impossible to produce a practically simultaneous operation of all the brakes on the train, as in the automatic system. For long trains this disadvantage renders the "straight" air-brake system practically inapplicable. For short trains, however, this disadvantage is practically of no importance, but there still exists a second objection in that the brakes are not automatically applied upon a breaking apart of the train, as is the case with the automatic system.

One object of my invention is to provide a modification of the "straight" air-brake system, which shall render automatic the application of the brakes upon a parting of the train, and thereby produce a system which, when applied to short trains, will possess all the advantages of both the "straight" and the automatic systems.

Another object of my invention is to enable a quicker application of the brakes to be made in case of emergency than is possible in the ordinary "straight" air-brake system.

My invention will best be understood by reference to the accompanying drawings, in which—

Figure 1 shows diagrammatically a train of two cars arranged in accordance with my invention, and Fig. 2 shows in cross-section an automatic valve adapted for use in my system.

In the drawings, C represents an air-compressor and R a main reservoir. The main reservoir R is connected through the automatic valve V to train-pipe L, which I shall hereafter designate as the main reservoir line. The main reservoir line L is connected through the motorman's valves M M', of the type usually employed in "straight" air-brake systems, to the train-pipe T, which corresponds to the single train line ordinarily used in "straight" air-brake systems. The train-pipe T is connected through the automatic valve V to the brake cylinder B. The second car, which I have shown as a trailer not provided with an air-compressor or motorman's valve, carries an auxiliary reservoir R', an automatic valve V' and a brake cylinder B'.

Although I have shown an equipment for a simple trailer, it will be understood that both cars may be motor cars equipped with separate compressors and with motorman's valves. Moreover, although I have shown only two cars, it will be understood that my invention is applicable to a train composed of a greater number of cars.

Referring now to Fig. 2, the construction of the automatic valve will be explained. The port connected to the main reservoir R is indicated by the reference character $r$. This port opens into a chamber 1, which is separated from the chamber 2 by a piston A. This piston carries a leather-seated valve E which, when the piston is in the position shown, separates chamber 1 from chamber 3. S is a compression spring which holds piston A normally in the position shown. Passages $a\ a$ are provided around piston A, affording a restricted passage between the chambers 1 and 2. $l$ represents the port for the main reservoir line L opening out from chamber 2. Piston A also carries the valve F situated in chamber 4, into which opens the port $t$ which is connected to the train-pipe T. The rod D connecting valve F to piston A is channeled out, as shown, so as to provide a communication between chambers 3 and 4 when piston A and valve F are in the position shown. From chamber 3 opens port $b$, which is connected to the brake cylinder B. The operation is then, as follows: with the piston A of the automatic valve V in the position shown in Fig. 2, assume that the motorman wishes to make a service stop: the motorman's valve M is moved in the usual manner to connect the main reservoir line L with train-pipe T. Air then flows from the main reservoir R through the port r into chamber 1; thence through the passages a a into chamber 2; thence through port l to main reservoir line L, through motorman's valve M, to train-pipe T, through port t of automatic valve V into chamber 4; thence to chamber 3; thence through port b to brake cylinder B. In the same manner air passes from train-pipe T through automatic valve V' to brake cylinder B'. The brakes are thus applied on both cars. To release the brakes, motorman's valve M is moved to connect train line T to atmosphere. The air then flows from brake cylinders B and B' backwards through automatic valves V and V', through train-pipe T, and motorman's valve M, to atmosphere. The brakes are thus applied and released in the same manner as in the ordinary brake system, and both application and release may be graduated by the motorman, as desired. If the cars should separate, however, main reservoir line L would be broken and connected directly to the atmosphere and the pressure therein would be suddenly lowered. A rush of air would consequently take place from main reservoir R through port r of auxiliary valve V, and pressing on piston A would move it against the pressure of spring S so as to close the passages a a. At the same time valve E is lifted from its seat, opening a passage from chamber 1 to chamber 3, while valve F is closed, cutting off the connection between chambers 3 and 4. The air consequently rushes directly from main reservoir R through chamber 1 to chamber 3, and thence through port b to brake cylinder B. In the same manner air from auxiliary reservoir R' on the trailer will be admitted directly to brake cylinder B'. Thus the brakes on both cars are automatically applied.

The system as above described has a further advantage in that it enables the motorman to make a very quick stop in case of emergency. The passages a a in the auxiliary valve V are so proportioned that for all ordinary service applications of the brakes sufficient difference of pressure would not exist between chambers 1 and 2 to move piston A. If it is desired to make an emergency stop, however, motorman's valve M may be thrown wide open to connect main reservoir line L to train-pipe T, in which case sufficient rush of air will occur to lower suddenly the pressure of air in line L, to move piston A, and to produce an emergency application of the brakes in the same manner as if the train had parted.

It is evident that the system above described, as well as the structure of the automatic valve, permits of many modifications which do not depart from the spirit of my invention. Accordingly, I aim in the appended claims to cover all such modifications which are within the spirit and scope of my invention.

What I claim as new, and desire to secure by Letters Patent of the United States, is,

1. In combination with a train of cars, two train-pipe lines, a reservoir on each car normally connected to one of said lines, a brake cylinder on each car normally connected to the second line, a manually-controlled valve adapted to connect said lines together to apply the brakes and to connect the second line to atmosphere to release the brakes, automatic means on each car adapted to connect reservoir directly to brake cylinder upon a sudden lowering of the pressure on the first of said lines, and a spring yieldingly opposing the movement of said automatic means.

2. In combination with a "straight" air-brake system, a reservoir on each car, a pipe line extending through the train and normally connected to each reservoir through a restricted passage adapted to permit the flow of air in either direction, automatic means on each car adapted to close said passage and to connect reservoir to brake cylinder upon a sudden lowering of the pressure in said train line, and a spring yieldingly opposing the movement of said automatic means.

3. In a "straight" air-brake system, a train line normally connected to the brake cylinders, a reservoir on each car, automatic means on each car for connecting reservoir directly to brake cylinder independently of said train line when the motorman's valve of said system is moved to full braking position, and a spring yieldingly opposing the movement of said automatic means.

4. In an air-brake system, two train pipe-lines, one normally carrying air at reservoir pressure and the other normally connected to brake cylinder, and an automatic valve on each car comprising a piston responsive to sudden changes in the first train-line, a spindle carried by said piston, two valves carried by said spindle, one in the connection between brake cylinder and the second train-line and the other in a connection between brake cylinder and reservoir, and a spring normally restraining said piston in position to hold the first valve open and the second closed.

5. In an air-brake system, two train pipe-lines, one normally carrying air at reservoir pressure and the other normally connected to brake cylinder, and an automatic valve on each car comprising a piston responsive to sudden changes in the first train-line, a spindle carried by said piston, two valves carried by said spindle, a connection from between said valves to brake cylinder, a connection from the outer side of one valve to reservoir, a connection from the outer side of the second valve to the second train-line, and a spring normally restraining said piston in position to hold the first valve closed and the second open.

6. In an air-brake system, two train pipe-lines, one normally carrying air at reservoir pressure and the other normally connected to brake cylinder, and an emergency valve on each car comprising a piston, a connection from one side of said piston to the first train-line, a connection from the other side of said piston to reservoir, a restricted passage connecting opposite sides of said piston, a spindle carried by said piston, a passage from the reservoir side of said piston to a brake cylinder connection, a valve carried by said spindle adapted to close said passage, a passage from the brake pipe connection to a connection to the second train-line, a second valve carried by said spindle adapted to close the last-mentioned passage, and a spring normally restraining said piston in position to hold the first valve closed and the second open.

7. In an air-brake system, a main reservoir, a motorman's valve, a straight air-pipe connected to said motorman's valve, brake cylinders and auxiliary reservoirs on one or more cars, a second train-pipe normally carrying air under pressure, and an automatic valve device for each brake cylinder having yielding resistance means for normally holding the same in position to establish communication from the straight air-pipe to the brake cylinder and arranged to be operated by a reduction of pressure in the second train-pipe to open communication from the auxiliary reservoir to the brake cylinder.

8. In an air-brake system, a main reservoir, a motorman's valve, a straight air-pipe connected to said motorman's valve, brake cylinders and auxiliary reservoirs on one or more cars, a second train-pipe normally carrying air under pressure, and an automatic valve device for each brake cylinder having yielding resistance means for normally holding the same in position to establish communication from the straight air-pipe to the brake cylinder and arranged to be operated by a reduction of pressure in the second train-pipe to open communication from the auxiliary reservoir to the brake cylinder, said valve device being arranged to establish in its normal position a restricted passage between said second train-pipe and auxiliary reservoir.

9. In an air-brake system, a main reservoir, a motorman's valve, a straight air-pipe connected to said motorman's valve, a second train-pipe normally carrying air under pressure, brake cylinders and auxiliary reservoirs on one or more cars, said auxiliary reservoirs being normally connected to said second train-pipe through restricted passages, and an automatic valve device for each brake cylinder having yielding resistance means for normally holding the same in position to establish communication from the straight air-pipe to the brake cylinder and arranged to be operated by a reduction of pressure in the second train-pipe to open communication from said auxiliary reservoir to the brake cylinder.

10. In an air-brake system, a reservoir, a brake cylinder, a train pipe normally carrying air under pressure, a straight-air pipe, said train pipe and straight-air pipe being connected to each other through the engineer's valve in straight-air applications of the brakes, an emergency valve device normally establishing communication from the straight-air pipe to the brake cylinder, means operative upon an abnormal reduction of pressure in the train-pipe for moving said valve to open communication from reservoir to brake cylinder, and means for preventing said movement upon ordinary variations of pressure in the train pipe such as occur in service applications of the brakes by straight-air.

11. In an air-brake system, a reservoir, a brake cylinder, a train pipe normally carrying air under pressure, a straight-air pipe, said train pipe and straight-air pipe being connected to each other through the engineer's valve in straight-air applications of the brakes, an emergency valve device normally establishing communication from the straight-air pipe to the brake cylinder, means operative upon an abnormal reduction of pressure in the train pipe for moving said valve to open communication from reservoir to brake cylinder, and a spring opposing the movement of said valve and adapted to prevent said movement upon ordinary variations of pressure in the train pipe such as occur in service applications of the brakes by straight-air.

12. In an air-brake system, a reservoir, a brake cylinder with a train pipe normally carrying air under pressure, a straight-air pipe, said train pipe and straight-air pipe being connected to each other through the engineer's valve in straight-air applications of the brakes, an emergency valve adapted to connect brake cylinder to the straight-air pipe or to reservoir, a piston operatively connected to said valve subjected on one side to train pipe and on the other to reservoir pressure, and a spring engaging said piston normally holding said valve in position to connect brake cylinder to straight-air pipe and adapted to prevent the movement of said piston upon ordinary variations of pressure in the train pipe such as occur in service applications of the brakes by straight-air.

13. In a train of cars, the combination with a "straight" air brake system comprising a brake cylinder, straight-air pipe, main reservoir for storing compressed air for the system, and motorman's valve controlling the pressure in the straight-air pipe, of a pipe extending from car to car of the train and normally carrying air under pressure, and an emergency valve device operative upon a sudden fall of pressure in the last mentioned pipe for disconnecting brake cylinder from the straight-air pipe and connecting it to main reservoir.

14. In a train of cars, the combination with a "straight" air brake system comprising a brake cylinder, straight-air pipe, main reservoir for storing compressed air for the system, and motorman's valve controlling the pressure in the straight-air pipe, of a pipe extending from car to car of the train and normally carrying air under pressure, a valve adapted to disconnect brake cylinder from the straight-air pipe and to connect it to main reservoir, and operating means for said valve subjected to the differential pressures of main reservoir and of the pipe normally carrying air under pressure.

15. In a train of cars, the combination with a "straight" air brake system comprising a brake cylinder, straight-air pipe, main reservoir constituting a storage supply of compressed air for the operation of the system, and motorman's valve controlling the operation of the system, of a pipe extending from car to car of the train and normally carrying air under pressure, and a spring-actuated emergency valve device operative upon a sudden fall of pressure in the last-mentioned pipe for disconnecting brake cylinder from the straight air pipe and connecting it to main reservoir.

16. In a train of cars, the combination with a "straight" air brake system comprising a brake cylinder, straight-air pipe, main reservoir constituting a storage supply of compressed air for the operation of the system, and motorman's valve controlling the operation of the system, of a pipe extending from car to car of the train and normally carrying air under pressure, and an emergency valve device operative upon a sudden fall of pressure in the last-mentioned pipe for disconnecting brake cylinder from the straight-air pipe and connecting it to main reservoir.

17. In a train of cars, the combination with a "straight" air brake system comprising a brake cylinder, straight-air pipe, main reservoir constituting a storage supply of compressed air for the operation of the system, and motorman's valve controlling the operation of the system, of an emergency valve normally establishing communication between the straight-air pipe and the brake cylinder, but arranged to be moved into a position to cut off said communication and to open communication from main reservoir to the brake cylinder, a spring opposing the movement of said valve, a piston for operating said valve having main reservoir pressure on one side thereof, and a pipe extending from car to car of the train containing air under pressure and connected to a chamber on the other side of said piston.

In witness whereof, I have hereunto set my hand this 29th day of April, 1904.

GEORGE MACLOSKIE.

Witnesses:
BENJAMIN B. HULL,
HELEN ORFORD.